(54) POLYIMIDE-BASED LITHIUM ION BATTERY

(76) Inventors: Scott D. Gustafson, 6030 Bowdendale Ave., Jacksonville, FL (US) 32216; Loel R. Nelson, 4495 S. Summer Haven Blvd., Jacksonville, FL (US) 32258; Joseph T. Antonucci, 11940 Huge Evergreen Ct., Jacksonville, FL (US) 32223

(*) Notice: Subject to any disclaimer, the term of this patent is extended or adjusted under 35 U.S.C. 154(b) by 127 days.

(21) Appl. No.: 09/636,686

(22) Filed: Aug. 11, 2000

Related U.S. Application Data

(60) Provisional application No. 60/219,328, filed on Oct. 18, 1999.

(51) Int. Cl.$^7$ ................................................ H01M 4/62
(52) U.S. Cl. ........................................ 429/217; 29/623.5
(58) Field of Search ............................... 429/212, 213, 429/217; 29/623.5

(56) References Cited

U.S. PATENT DOCUMENTS

| | | |
|---|---|---|
| 3,551,211 A | 12/1970 | Grulke |
| 4,385,130 A | 5/1983 | Molinski et al. |
| 4,416,915 A | 11/1983 | Palmer et al. |
| 4,537,843 A | 8/1985 | Shishikura et al. |
| 4,598,466 A | 7/1986 | Arenas et al. |
| 4,615,959 A | 10/1986 | Hayashi et al. |
| 4,830,939 A | 5/1989 | Lee et al. |
| 4,977,007 A | 12/1990 | Kondo et al. |
| 5,021,129 A | 6/1991 | Arbach et al. |
| 5,041,346 A | 8/1991 | Giles |
| 5,196,279 A | 3/1993 | Tarascon |
| 5,296,318 A | 3/1994 | Gozdz et al. |
| 5,348,818 A | * 9/1994 | Asami et al. ............... 429/213 |
| 5,407,593 A | 4/1995 | Whang |
| 5,418,091 A | 5/1995 | Gozdz et al. |

(List continued on next page.)

FOREIGN PATENT DOCUMENTS

| | | | | |
|---|---|---|---|---|
| JP | 10-188992 | * | 7/1998 | ............ H01M/4/62 |
| WO | WO 98/35397 | * | 8/1998 | ............ H01M/4/62 |

OTHER PUBLICATIONS

K. Kojima et al., "Secondary Lithium Batteries," Chemical Abstract No. 127:334157, Oct. 21, 1997.

H. Tomiyama, "Secondary Nonaqueous Electrolyte Batteries," Chemical Abstract No. 127:83875, May 20, 1997.

T. Motonami et al., "Secondary Nonaqueous Lithium Batteries with Carbonaceous Electrodes," Chemical Abstract No. 126:120047, Nov. 29, 1996.

T. Uei, "Manufacture of Secondary Lithium Battery Anodes," Chemical Abstract No. 122:60180, Aug. 12, 1994.

T. Otagawa et al., "Three–Dimensional Microstructure as a Substrate for a Battery Electrode," Chemical Abstract NO. 120:327532, Mar. 15, 1994.

K. Asami et al., "Carbonaceous Material and Battery Using this Material," Chemical Abstract No. 120:168817, Jul. 28, 1993.

(List continued on next page.)

*Primary Examiner*—Stephen Kalafut
(74) *Attorney, Agent, or Firm*—Joy L. Bryant

(57) ABSTRACT

A polyimide-based lithium ion battery is presented. The battery comprises at least one anode and at least one ionically conductive and electrochemically active cathode; or at least one ionically conductive and electrochemically active anode and a cathode; or at least one ionically conductive and electrochemically active anode and at least one ionically conductive and electrochemically active cathode. The source of the ionic conductivity and electronic activity. in either the anode, the cathode (or both) lies in a solid electrolyte polyimide binder comprising a lithium salt and a pre-imidized soluble, amorphous, thermoplastic polyimide powder. The batteries of the present invention do not require adhesives or interlayer bonding which may fail and they have at least one ionically conductive and electrochemically active electrode, enhancing the overall performance of the battery.

26 Claims, 2 Drawing Sheets

U.S. PATENT DOCUMENTS

| | | |
|---|---|---|
| 5,445,906 A | 8/1995 | Hobson et al. |
| 5,460,904 A | 10/1995 | Gozdz et al. |
| 5,462,820 A | 10/1995 | Tanaka |
| 5,468,571 A | 11/1995 | Fujimoto et al. |
| 5,470,357 A | 11/1995 | Schmutz et al. |
| 5,491,041 A | 2/1996 | Abraham et al. |
| 5,503,948 A | 4/1996 | MacKay et al. |
| 5,512,389 A | 4/1996 | Dasgupta et al. |
| 5,529,860 A | 6/1996 | Skotheim et al. |
| 5,587,253 A | 12/1996 | Gozdz et al. |
| 5,591,250 A | 1/1997 | Stern et al. |
| 5,597,661 A | 1/1997 | Takeuchi et al. |
| 5,601,947 A | 2/1997 | Skotheim et al. |
| 5,607,485 A | 3/1997 | Gozdz et al. |
| 5,620,811 A | 4/1997 | Zhang et al. |
| 5,658,691 A | 8/1997 | Suzuki et al. |
| 5,690,702 A | 11/1997 | Skotheim et al. |
| 5,691,081 A | 11/1997 | Krause et al. |
| 5,888,672 A | 3/1999 | Gustafson et al. |
| 5,898,731 A | 4/1999 | Clingempeel |
| 6,001,507 A | 12/1999 | Ono et al. |

OTHER PUBLICATIONS

T. Morimoto et al., "Secondary Nonaqueous Batteries with Mixture Anodes," Chemical Abstract No. 112:102125, Jul. 26, 1989.

T. Morimoto et al., "Nonaqueous–electrolyte Load–leveling Battery," Chemical Abstract No. 110:78327, Sep. 8, 1998.

T. Morimoto et al., "Secondary Nonaquesou Batteries," Chemical Abstract No. 110:61123, Sep. 6, 1988.

S. Taguchi et al., "Secondary–Battery Electrodes from Conductive Pyrolysis Production of Polyimide," Chemical Abstract No. 107:43127, Dec. 8, 1986.

R. Clark, "Thermal Analysis and Thermal Batteries," Chemical Abstract No.90:171466, 1976 (Month unknown).

J. J. Auborn et al., "Corrosion and Compatibility of Materials in Inorganic Oxyhalides," Chemical Abstract No. 84:138293, 1974. (Month unknown).

M.A. Ratner and D.F. Shriver, "Ion Transport in Solvent–Free Polymers", *Chemical Reviews,* 1988, pp. 109–122, vol. 88, No. 1., American Chemical Society, USA. (Month unknown).

Herve Cheradame, "A Comprehensive Theory of the High Ionic Conductivity of Macromolecular Networks," *IUPAC Maccromolecules,* 1982, pp. 251–264, Pergamon Press, New York. (Month not applicable).

Kenneth S. Cole and Robert H. Cole, "Dispersion and Absorption in Dielectrics: I. Alternating Current Characteristincs," *The Journal of Chemical Physics,* Jan.–Dec. 1941, pp. 341–351, vol. 9, American Institute of Physics, USA.

J.R. Dahn, Tao Zheng, Yinghu Lu, and J.S. Xue, "Mechanisms for Lithium Insertion in Carbonaceous Materials," *Science,* Oct. 27, 1995, pp. 590–593, vol. 270, USA.

N. Oyama, T. Tatsuma, T. Sato and T. Sotomura, "Dimer-captan–polyaniline Composite Electrodes for Lithium Batteries with High Energy Density," *Nature,* Feb. 16, 1995, pp. 598–600, vol. 373, USA.

J. Simon Xue, Jeffrey A. Read, Edward A. Cuellar, Markus Wittman, Michael E. Manna, Brendan M. Coffey, and Ralph Wise, "Performance Characteristics of a Marketable Lithium Ion Solid Polymer Battery," Publication Unknown, publication date unknown, pp. 211–216.

V.L. Teofilo, "High Capacity Lithium Solid Polymer Battery Development," Publication Unknown, publication date unknown, pp. 217–220.

K.M. Abraham and Z. Jiang, "PEO–Like Polymer Electrolytes with High Room Temperature Conductivity," *J. Electrochemical Society,* Jun. 1997, pp. 136–138, vol. 144, No. 6, The Electrochemical Society, Inc.

Luying Sun, Katsuhiro Higaki and Robert C. McDonald, "Performance Characteristics of Lithium Ion Cells using in situ Polymerized Electrolytes," Publication Unknown, publication date unknown.

J. Ross MacDonald, "Theory of Space–Charge Polarization and Electrode–Discharge Effects," *The Journal of Chemical Physics,* Jun. 1, 1974, pp. 4982–5001, vol. 58, No. 11, USA.

Hong Gan, Randolf A. Leising, Marcus Palazzo, Steven M. Davis, and Esther S. Takeuchi, "The Effect of Binder Type on Li–Ion Electrode Performance," *15th International Seminar and Exhibit on Primary and Secondary Batteries,* Mar. 3, 1998, pp. 1–12.

* cited by examiner

POLYIMIDE-BASED LITHIUM ION BATTERY

CROSS-REFERENCE TO RELATED APPLICATIONS

This application claims the benefit of U.S. provisional application serial No. 60/219,328, filed Oct. 18, 1999, hereby incorporated by reference in its entirety.

FIELD OF THE INVENTION

The present invention relates to lithium ion batteries. In particular, it is related to lithium ion batteries containing a liquid electrolyte and at least one ionically conductive and electrochemically active polyimide-based electrode.

BACKGROUND OF THE INVENTION

Typical rechargeable lithium cells use lithium metal electrodes as an ion source in conjunction with positive electrodes. These positive electrodes comprise compounds capable of intercalating the lithium ions within their structure during discharge of the cell. These cells rely on separator structures or membranes that physically contain a measure of fluid electrolyte, usually in the form of a solution of a lithium compound. The separator structure also provides a means for preventing destructive contact between the electrodes of the cell. Sheets or membranes ranging from glass fiber filter paper or cloth to microporous polyolefin film or nonwoven fabric have been saturated with solutions of a lithium compound, such as $LiClO_4$, $LiPF_6$, or $LiBF_4$, in an organic solvent such as propylene carbonate, diethoxyethane, or dimethyl carbonate, to form an electrolyte/separator element. A fluid electrolyte bridge is thus established between the electrodes and effectively provides the necessary $Li^{++}$ ion mobility at conductivities in the range of about $10^{-3}$ S/cm.

Gozdz et al. (U.S. Pat. No. 5,460,904) point out that these separator elements unfortunately comprise sufficiently large solution-containing voids establishing continuous avenues between the electrodes. In turn, lithium dendrite formation is enabled during charging cycles and eventually internal cell short-circuiting occurs. To combat this problem, lithium-ion cells have been made where both electrodes comprise intercalation materials, such as lithiated metal oxides, graphites, and carbons. This eliminates the lithium metal which promotes the deleterious dendrite growth. However, these cells do not attain the capacity provided by lithium metal electrodes.

Gozdz et al. proposed an electrolytic cell electrode and separator elements that employ a combination of poly(vinylidene fluoride)copolymer matrix and a compatible organic solvent plasticizer which maintains a homogeneous composition in the form of a flexible, self-supporting film. The copolymer comprises about 75 to 92% by weight vinylidene fluoride (VdF) and 8 to 25% hexafluoropropylene (HFP). The HFP limits the crystallinity of the final copolymer to a degree such that it ensures good film strength while enabling the retention of about 40 to 60% of preferred solvents for lithium electrolyte salts. Within this range of solvent content, the 5 to 7.5% salt ultimately comprising a hybrid electrolyte membrane yields an effective room temperature ionic conductivity of about $10^{-4}$ to $10^{-3}$ S/cm, yet the membrane exhibits no evidence of solvent exudation which might lead to cell leakage or loss of conductivity.

Each electrode is typically prepared from a collector foil in the form of an open mesh, upon which is laid either a positive or a negative electrode membrane. This membrane comprises an intercalatable material dispersed in a polymeric binder matrix such as poly(vinylidene fluoride) or poly(tetrafluoroethylene). The binder matrix provides no electrochemical benefit to the electrode and functions strictly to hold the intercalatable materials to the collector foil while the electrodes are exposed to the liquid electrolyte. Typically, these binders are fluorinated polymers.

The use of fluorinated polymers proves to be destructive to the cell because lithium has a tendency to react with the fluorine in the polymer to form lithium fluoride. This reduction leads to degradation of performance since the lithium ions are removed from the charge/discharge reaction. In addition, the fluorinated polymers may decompose to generate hydrogen fluoride which reacts vigorously and exothermically with the lithium salt to degrade or halt the operation of the battery. Although the currently used binders have good cohesive properties for holding or consolidating particles, they are poor adherents for binding particles to the metal current collectors. Some of these binders also contain moisture which reacts with the lithium salts and degrades performance. Lastly, some of the binders cannot withstand exposure to high temperatures. Therefore, the useful temperature range for the battery is limited.

Fujimoto et al. (U.S. Pat. No. 5,468,571) addressed the temperature problem by providing a secondary battery wherein the negative electrode is prepared with a polyimide binder. However, the polyimides used by Fujimoto et al. are condensation type polyimides which require a dehydration condensation reaction. If the dehydration condensation reaction has not been driven to completion, water may be released when the battery temperature becomes abnormally high. This residual water reacts vigorously with lithium. Although polyimides exhibit good binding and adhesion properties, Fujimoto et al. observed that use of polyimides in excess of 2 parts by weight caused a decrease in capacity.

Gan et al. ("The Effect of Binder Type on Li-Ion Electrode Performance", $15^{th}$ *International Seminar and Exhibit on Primary and Secondary Batteries,* Mar. 3, 1998, pp. 1–12.) studied the use of polyimides as binders for both anodes and cathodes. They observed that graphite (anodes) electrodes with polyimide binder exhibited high irreversible capacities and the higher the polyimide concentration, the larger the irreversible capacity. However, they also noted that although graphite anodes containing polyimide binder showed reasonably good adhesion to the foil substrate, they were much more brittle and prone to cracking than the PVDF-type electrodes. For the cathode, it was found that test cells having a polyimide ($\geq 3.6\%$) binder had practically no charge capacities and could not be cycled. In addition, when the binder content was reduced, the test cells continued to not cycle well. It was concluded that cathodes using polyimide binders were more brittle than the other cathodes and suffered from cracking.

Gustafson et al. (U.S. Pat. No. 5,888,672) disclose a battery where the anode, the cathode, and the electrolyte each comprise a soluble, amorphous, thermoplastic polyimide. Since the polyimides are pre-imidized prior to the fabrication of the battery, there is no need to further cure them at high temperatures, thus reducing the risk of damaging the battery. Nor is there a chance of incidental condensation as the battery temperature rises. In addition, since no further polymerization will occur, there are no byproducts of the condensation reaction (water) to interact with the lithium salts. The battery of Gustafson et al. is a dry cell.

In fabricating the battery, a minimal amount of pressure or an adhesive is applied to the laminate to allow for intimate lateral contact to be made between the layers. Ultimately, a uniform assembly is formed that is self-bonded and exhibits adhesion between the layers. Since the polyimides used are amorphous, there is an unobstructed pathway for ionic mobility. However, the battery of Gustafson et al. requires bonding or application of an adhesive (prepared from the electrolyte solution) between the layers to promote an unobstructed pathway for ionic mobility. If there are any gaps or defects between the layers, the ionic pathway is upset and the battery function is impaired.

An object of the present invention is to provide a polyimide-based battery wherein the ionic conductivity is insured through the use of a solid electrolyte polyimide binding material.

Another object of the present invention is to provide a polyimide-based battery having at least one ionically conductive and electrochemically active electrode.

Another object of the present invention is to provide a polyimide-based battery that has excellent high temperature stability.

Another object of the present invention is to provide a polyimide-based battery that has a low (less than 1%) initial fade rate over 50 cycles.

Another object of the present invention is to provide a polyimide-based battery where the anode and/or the cathode are not brittle.

Another object of the present invention is to provide a polyimide-based battery having good cohesive properties within the electrolyte film layers.

Another object of the present invention is to provide a polyimide-based battery having good adhesion of the electrode films to the metal current collectors of the cell.

Another object of the present invention is to provide a polyimide-based battery which has reduced HF formation in comparison to prior art batteries.

Another object of the present invention is to provide a polyimide-based battery which is less sensitive to over-charging and discharging than prior art batteries.

SUMMARY OF THE INVENTION

The foregoing and other objects were achieved by the present invention which is a battery having at least one anode; at least one ionically conductive and electrochemically active polyimide-based cathode; at least one separator film disposed between each anode and each cathode; and a liquid electrolyte distributed throughout each anode, each cathode, and each separator film. The cathode comprises a cathode current collector; a metal oxide; an electronic conductive filler; and an ionically conductive and electrochemically active cathode solid electrolyte polyimide binder. For the purpose of this specification and the appended claims, a solid electrolyte is defined as an electrolyte medium that does not contain solvent but provides for the transfer of lithium ions. In other words, the electrolyte medium is dry or contains no solvent. The ionically conductive and electrochemically active cathode solid electrolyte polyimide binder comprises a lithium salt and a pre-imidized soluble, amorphous, thermoplastic polyimide powder. Both the lithium salt and the pre-imidized soluble, amorphous, thermoplastic polyimide powder are soluble in any polar solvent. Preferably, the polar solvent is selected from the group consisting of: N-methylpyrolidinone (NMP), N,N-dimethylacetamide (DMAc), tetrahydrofuran (THF), cyclohexanone, 1,4-dioxane, chloroform, acetophenone, ethylene chloride, gamma-butyrolactone, m-cresol, methyl- ene chloride, methyl ethyl ketone, methoxypropanol, and dimethylformamide (DMF). The ionically conductive and electrochemically active cathode may be combined with any anode, such as a composite anode or a lithium metal anode; a separator film; and any liquid electrolyte known to those skilled in the art to form the battery of the present invention.

In another embodiment of the invention, the anode is ionically conductive and electrochemically active. The anode comprises an anode current collector; an electronic conductive filler; an intercalation material; and an ionically conductive and electrochemically active anode solid electrolyte polyimide binder. The ionically conductive and electrochemically active anode solid electrolyte polyimide binder comprises a lithium salt and a pre-imidized soluble, amorphous, thermoplastic polyimide powder. As with the cathode previously described, both the lithium salt and the pre-imidized soluble, amorphous, thermoplastic polyimide powder are soluble in any polar solvent known to those of ordinary skill in the art and, in particular, the solvent is either N-methylpyrolidinone (NMP), N,N-dimethylacetamide (DMAc), tetrahydrofuran (THF), cyclohexanone, 1,4-dioxane, chloroform, acetophenone, ethylene chloride, gamma-butyrolactone, m-cresol, methylene chloride, methyl ethyl ketone, methoxypropanol, and dimethylformamide (DMF) or various combinations thereof. The ionically conductive and electrochemically active anode may be combined with any cathode, separator film, and liquid electrolyte known to those skilled in the art or it may be used with the ionically conductive and electrochemically active cathode previously described to form a liquid electrolyte lithium ion battery.

The polyimide-based lithium ion batteries of the present invention are more energy efficient than prior art lithium ion batteries. Since at least one of the electrodes is ionically conductive and electrochemically active, the overall battery performance is enhanced. The batteries of the present invention have a longer cycle life and run time than those of the prior art. In particular, they exhibited an unexpectedly lower initial fade rate (0.06% fade rate over 50 cycles as compared to a 0.23% fade rate over 50 cycles) than the prior art batteries. In addition, the batteries of the present invention are less sensitive to over-charging and over-discharging of battery systems, thus safeguarding against thermal runaway. This minimizes the need for additional electronic safety systems, thereby reducing the overall cost for producing the battery. These types of batteries are particularly useful for portable electronic devices such as laptop computers, camcorders, super-capacitors, and cellular telephones as well as electronic chips.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principles thereof, and in which.

DETAILED DESCRIPTION OF THE PREFERRED EMBODIMENTS

Figure 1:
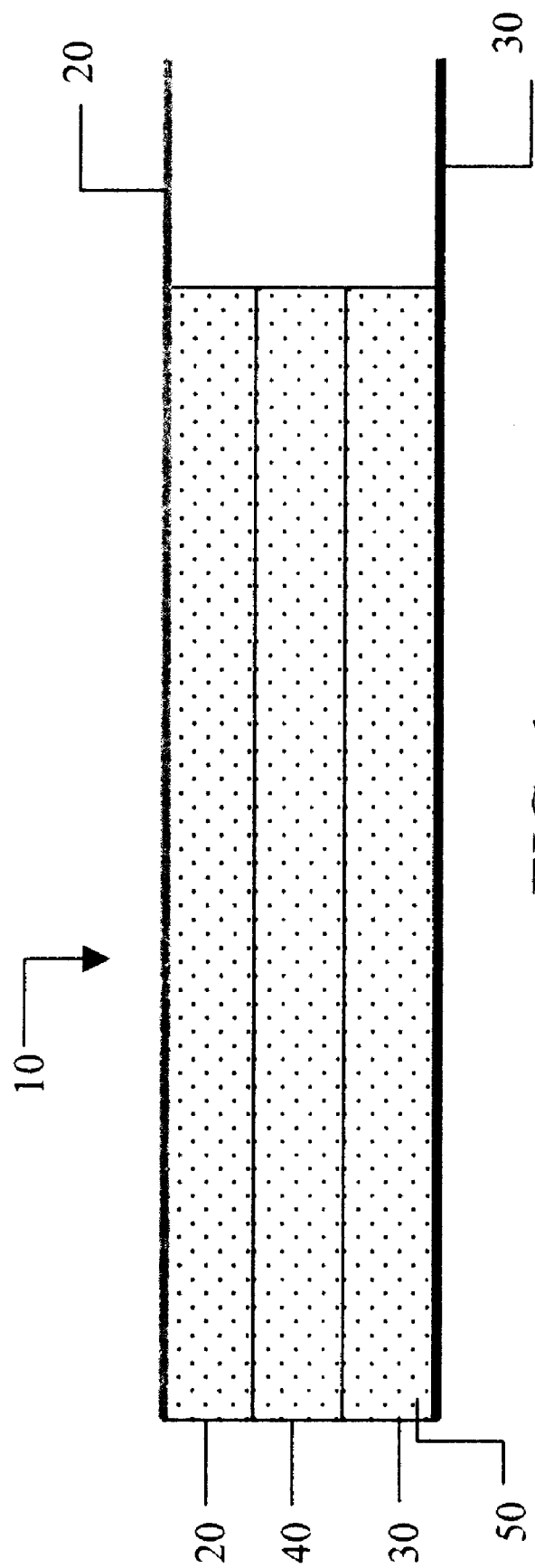
FIG. 1 is a cross-sectional view of the battery of the present invention.

FIG. 1 is a cross-sectional view of the battery 10 of the present invention. In particular, the battery 10 comprises at least one anode 20, at least one cathode 30, at least one separator film 40 disposed between each anode 20 and each cathode 30, and a liquid electrolyte 50 which is distributed throughout and contacts each anode, cathode and separator film. Either the anode, the cathode or both are polyimide-based and are ionically conductive and electrochemically active. A portion of each cathode 30 is extended to come into contact with an external positive terminal (not shown). Likewise, a portion of each anode 20 is extended to come into contact with a negative terminal (not shown) to permit the chemical energy generated inside the battery to be removed as electrical energy. The battery is typically hermetically sealed in a container (not shown).

In general, each cathode comprises a metal cathode current collector; a metal oxide; an electronic conductive filler; and an ionically conductive and electrochemically active cathode solid electrolyte polyimide binder. The ionically conductive and electrochemically active cathode solid electrolyte polyimide binder comprises a lithium salt and a pre-imidized soluble, amorphous, thermoplastic polyimide powder. The lithium salt and the pre-imidized polyimide powder are soluble in any polar solvent known to those of ordinary skill in the art. In particular, the solvent is N-methylpyrolidinone (NMP), N,N-dimethylacetamide (DMAc), tetrahydrofuran (THF), cyclohexanone, 1,4-dioxane, chloroform, acetophenone, ethylene chloride, gamma-butyrolactone, m-cresol, methylene chloride, methyl ethyl ketone, methoxypropanol, and dimethylformamide (DMF) and combinations thereof.

In one embodiment of the invention, each cathode is prepared from about 33% by weight to about 44% by weight of a metal oxide; from about 6% by weight to about 25% by weight of an electronic conductive filler; from about 27% by weight to about 35% by weight of a polar solvent such as a solvent selected from the group consisting of: N-methylpyrolidinone (NMP), N,N-dimethylacetamide (DMAc), tetrahydrofuran (THF), cyclohexanone, 1,4-dioxane, chloroform, acetophenone, ethylene chloride, gamma-butyrolactone, m-cresol, methylene chloride, methyl ethyl ketone, methoxypropanol, and dimethylformamide (DMF); and from about 17% by weight to about 30% by weight of a cathode electrolyte polyimide binder solution.

Preferably, the cathode electrolyte polyimide binder solution comprises from about 7% by weight to about 12% by weight of a pre-imidized soluble, amorphous, thermoplastic polyimide powder dissolved in about 70% by weight to about 85% by weight of a polar solvent such that the solvent is selected from the group consisting of: N-methylpyrolidinone (NMP), N,N-dimethylacetamide (DMAc), tetrahydrofuran (THF), cyclohexanone, 1,4-dioxane, chloroform, acetophenone, ethylene chloride, gamma-butyrolactone, m-cresol, methylene chloride, methyl ethyl ketone, methoxypropanol, and dimethylformamide (DMF); and about 8% by weight to about 13% by weight of a lithium salt. Preferably, the lithium salt is selected from the group consisting of: LiCl, LiBr, LiI, Li(ClO$_4$), Li(BF$_4$), Li(PF$_6$), Li(AsF$_6$), Li(CH$_3$CO$_2$), Li(CF$_3$SO$_3$), Li(CF$_3$SO$_2$)$_2$N, Li(CF$_3$SO$_2$)$_3$, Li(CF$_3$CO$_2$), Li(B(C$_6$H$_5$Li(NO$_3$). Most preferably, the lithium salt is Li(PF$_6$). The lithium salt provides ionic conductivity to the cathode.

Any pre-imidized soluble, amorphous, thermoplastic polyimide powder known to those skilled in the art may be used for the present invention, provided that the polyimide is soluble in a polar solvent. In particular, the solvent is selected from the group consisting of: N-methylpyrolidinone (NMP), N,N-dimethylacetamide (DMAc), tetrahydrofuran (THF), cyclohexanone, 1,4-dioxane, chloroform, acetophenone, ethylene chloride, gamma-butyrolactone, m-cresol, methylene chloride, methyl ethyl ketone, methoxypropanol, and dimethylformamide (DMF). Examples of suitable polyimides include but are not limited to: MATRIMID 5218 and 9725 commercially available from Ciba-Geigy; ULTEM 1000 and 2000 commercially available from General Electric; and LaRC-CP1, LaRC-CP2, and LaRC-SI all of which are available from Imitec, Inc., Schenectady, N.Y. Each of these polyimides come as pre-imidized powders that are soluble in polar solvents. Since the polyimide powders are pre-imidized, no additional condensation reaction takes place and thus, the possibility of forming water as a byproduct is reduced if not eliminated.

Metal oxides are used in preparing the cathode of the present invention. Preferably, these metal oxides include but are not limited to: LiCoO$_2$; LiMnO$_2$; LiNiO$_2$; V$_6$O$_3$; V$_2$O$_5$; and LiMn$_2$O$_4$ and their equivalents.

Various electronic conductive fillers are also employed when preparing the cathodes of the present invention. In particular, such fillers include but are not limited to: conductive carbon, carbon black, graphite, and graphite fiber.

When preparing the cathode, a cathode electrolyte polyimide binder solution is prepared first. Next, a cathode slurry is prepared by adding a metal oxide, more solvent, and an electronic conductive filler to the cathode electrolyte polyimide binder solution. A cathode current collector, typically a metal foil, preferably aluminum or nickel, is coated with the slurry. The coated cathode current collector is dried at a temperature suitable to drive off the solvent to form an ionically conductive and electrochemically active cathode such that a cathode film layer forms on the cathode current collector. The resulting cathode of the present invention had excellent charge capacity and was flexible, not brittle or prone to cracking. In addition, the cathode exhibited good cohesion of the cathode film and adhesion between the cathode film and the cathode current collector. It was observed that the solid electrolyte polyimide binder imparts ionic conductivity and electrochemical activity to the resulting cathode (electrode).

In one embodiment of the invention, the anode may be any anode known to those skilled in the art and typically used for a liquid (or gel) electrolyte lithium ion battery. The anode is constructed such that a metal current collector or any electrically conductive substrate is coated with an active matrix slurry. Typically, the metal current collector is made of copper or nickel. The slurry is prepared from an organic binder, for example, poly(vinyl formal) resin or poly (vinylidene fluoride); a conductivity enhancing filler such as carbon, carbon black, graphite, and graphite fiber; and an intercalation compound such as carbon, activated carbon, graphite, petroleum coke, and a nickel powder.

In an alternative embodiment of the invention, the anode is ionically conductive and electrochemically active and generally comprises: an anode current collector; an electronic conductive filler; an intercalation material; and an ionically conductive and electrochemically active anode solid electrolyte polyimide binder. In general, the ionically conductive and electrochemically active anode solid electrolyte polyimide binder comprises a lithium salt and a pre-imidized soluble, amorphous, thermoplastic polyimide powder. The lithium salt and the pre-imidized soluble, amorphous, thermoplastic polyimide powder are soluble in a polar solvent, and in particular a solvent selected from the group consisting of:N-methylpyrolidinone (NMP), N,N-dimethylacetamide (DMAc), tetrahydrofuran (THF), cyclohexanone, 1,4-dioxane, chloroform, acetophenone, ethylene chloride, gamma-butyrolactone, m-cresol, methylene chloride, methyl ethyl ketone, methoxypropanol, and dimethylformamide (DMF).

Preferably, the ionically conductive and electrochemically active anode is prepared from about 38% by weight to about 50% by weight of intercalation material; from about 2% by weight to about 12% by weight of a conductive filler; from about 28% by weight to about 40% by weight of a polar solvent such as that selected from the group consisting of: N-methylpyrolidinone (NMP), N,N-dimethylacetamide (DMAc), tetrahydrofuran (THF), cyclohexanone, 1,4-dioxane, chloroform, acetophenone, ethylene chloride, gamma-butyrolactone, m-cresol, methylene chloride, methyl ethyl ketone, methoxypropanol, and dimethylformamide (DMF); and from about 13% by weight to about 20% by weight of an anode electrolyte polyimide binder solution. Most preferably, the anode electrolyte polyimide binder solution comprises from about 6% by weight to about 12% by weight of a lithium salt and from about 9% by weight to about 15% by weight of a pre-imidized soluble, amorphous, thermoplastic polyimide powder dissolved in about 75% by weight to about 85% by weight of a polar solvent such as that selected from the group consisting of: N-methylpyrolidinone (NMP), N,N-dimethylacetamide (DMAc), tetrahydrofuran (THF), cyclohexanone, 1,4-dioxane, chloroform, acetophenone, ethylene chloride, gamma-butyrolactone, m-cresol, methylene chloride, methyl ethyl ketone, methoxypropanol, and dimethylformamide (DMF).

Any pre-imidized soluble, amorphous, thermoplastic polyimide powder known to those skilled in the art may be used provided that the pre-imidized polyimide powder is soluble in a polar solvent. Preferably, the solvent is selected from the group consisting of: N-methylpyrolidinone (NMP), N,N-dimethylacetamide (DMAc), tetrahydrofuran (THF), cyclohexanone, 1,4-dioxane, chloroform, acetophenone, ethylene chloride, gamma-butyrolactone, m-cresol, methylene chloride, methyl ethyl ketone, methoxypropanol, and dimethylformamide (DMF). The pre-imidized polyimide powder selected for the ionically conductive and electrochemically active anode solid electrolyte polyimide binder may have the same chemical composition as the pre-imidized polyimide powder used to prepare the ionically conductive and electrochemically active cathode solid electrolyte polyimide binder or, alternatively, the chemical composition may be different. Examples of suitable pre-imidized polyimide powders include but are not limited to: MAT-RIMID 5218 and 9725 commercially available from Ciba-Geigy; ULTEM 1000 and 2000 commercially available from General Electric; and LaRC-CP1, LaRC-CP2, and LaRC-SI all of which are available from Imitec, Inc., Schenectady, N.Y. Each of these polyimides come as pre-imidized powders that are soluble in polar solvents. Since they are pre-imidized, no additional condensation reaction takes place and thus, the possibility of forming water as a byproduct is reduced if not eliminated.

In order to provide ionic conductivity to the anode, a lithium salt is added to the composition. Any lithium salt known to those skilled in the art may be used. More specifically, the lithium salt is selected from the group consisting of: LiCl, LiBr, LiI, Li(ClO$_4$), Li(BF$_4$), Li(PF$_6$), Li(AsF$_6$), Li(CH$_3$CO$_2$), Li(CF$_3$SO$_3$), Li(CF$_3$SO$_2$)$_2$N, Li(CF$_3$SO$_2$)$_3$, Li(CF$_3$CO$_2$), Li(B(C$_6$H$_5$)$_4$), Li(SCN), and Li(NO$_3$). Most preferably, the lithium salt is Li(PF$_6$).

When preparing the anode of the present invention, a process similar to the preparation of the aforementioned cathode is followed. An anode electrolyte polyimide binder solution comprising a lithium salt and a pre-imidized soluble, amorphous, thermoplastic polyimide powder dissolved in a polar solvent such as that selected from the group consisting of: N-methylpyrolidinone (NMP), N,N-dimethylacetamide (DMAc), tetrahydrofuran (THF), cyclohexanone, 1,4-dioxane, chloroform, acetophenone, ethylene chloride, gamma-butyrolactone, m-cresol, methylene chloride, methyl ethyl ketone, methoxypropanol, and dimethylformamide (DMF) is prepared. An electronic conductive filler; a polar solvent such as that selected from the group consisting of: N-methylpyrolidinone (NMP), N,N-dimethylacetamide (DMAc), tetrahydrofuran (THF), cyclohexanone, 1,4-dioxane, chloroform, acetophenone, ethylene chloride, gamma-butyrolactone, m-cresol, methylene chloride, methyl ethyl ketone, methoxypropanol, and dimethylformamide (DMF); and an intercalation material is added to the anode electrolyte polyimide binder solution to form an anode slurry. The anode slurry is coated on an anode current collector. The anode current collector is dried at a suitable temperature to remove the solvent to form an ionically conductive and electrochemically active anode. The anode has an anode film layer formed on the anode current collector. The resulting anode had excellent charge capacity and was flexible, not brittle or prone to cracking. In addition, it exhibited good cohesion of the anode film and good adhesion between the anode film and the anode current collector. It was observed that the solid electrolyte polyimide binder imparts ionic conductivity and electrochemical activity to the anode electrode.

The battery of the present invention may be prepared using various anode and cathode combinations. For example, in one configuration only the cathode comprises the ionically conductive and electrochemically active cathode solid electrolyte polyimide binder and any anode known to those of ordinary skill in the art, such as a composite anode or a lithium metal anode, may be employed. Alternatively, only the anode may comprise the ionically conductive and electrochemically active anode solid electrolyte polyimide binder and any cathode known to those of ordinary skill in the art may be employed. In a third embodiment, both the anode and the cathode comprise the ionically conductive and electrochemically active solid electrolyte polyimide binders. When this is the case, the chemical composition of the pre-imidized polyimide powder may be either the same or different for the anode and the cathode. Whatever the configuration, the battery must contain a separator film and a liquid electrolyte in addition to the anode and the cathode to be fully operational.

Any separator film known to those skilled in the art may be used as a barrier between each anode and cathode layer. The separator film is a freestanding film comprised of an organic polymer, such as polypropylene, and generally saturated with a liquid lithium electrolyte solution. Examples of such films include but are not limited to Kynar FLEX from Atochem North America; and CELGARD 3401 from Polyplastics Co., Ltd.

In fabricating the battery, an anode, a separator film, and a cathode are assembled in alternate layers to form a cell stack. The separator film needs to be positioned between the anode and the cathode layers to prevent shorting in the cell. The cell stack may be of any configuration known to those skilled in the art. Examples of various configurations include but are not limited to: prismatic, folded, wound, cylindrical, and jelly rolled. Once the cell stack is formed, pressure is applied to it and maintained. The pressurized cell stack is placed in a container wherein the pressure on the stack is maintained. The cell stack must be assembled using pressure, without adhesives. The pressure is maintained when the cell stack in placed into the battery container. Since no adhesives are employed and there is no bonding between the layers, the chance of having adhesive failure or gaps between the layers of the cell is removed. Therefore, the pathway for ionic mobility is not disrupted. A liquid electrolyte is introduced into the container and the container is hermetically sealed to prevent leakage.

Any liquid electrolyte known to those skilled in the art may be used for the present invention. Typical electrolytes comprise lithium salts dissolved in a variety of organic binders such as ethylene carbonate, acetonitrile, butyrolactone, diethyl carbonate, 1,2-dimethoxyethane, propylene carbonate, tetrahydrofuran, 1,3-dioxolane, dimethyl carbonate, ethylmethyl carbonate, and 1-methyl-2-pyrrolidone. The liquid electrolyte is generally uniformly dispersed throughout the anode, separator film, and cathode intimately contacting the exposed ionically active components to permit free movement of lithium ions and to support the charge and discharge activities within the battery.

EXAMPLES

Example 1

The electrodes and electrolyte solution for a polyimide-based lithium-ion battery were prepared according to the following formulations:

Cathode Electrolyte Polyimide Binder Solution

| Raw Material | % by weight |
|---|---|
| MATRIMID 5218 | 7–12 |
| Lithium Salt | 8–13 |
| NMP | 70–85 |

The pre-imidized soluble, amorphous, thermoplastic polyimide powder, MATRIMID 5218, commercially available from Ciba-Geigy, was dissolved in 42–65% of the NMP to form a cathode polyimide solution. A lithium salt solution, prepared by dissolving a lithium salt in the remaining portion of NMP, was added to the cathode polyimide solution to form the cathode electrolyte polyimide binder solution.

Cathode

| Raw Material | % by weight |
|---|---|
| Metal Oxide ($LiMn_2O_4$) | 33–44 |
| Conductive Filler (carbon black) | 6–25 |
| NMP | 27–35 |
| Cathode Electrolyte Polyimide Binder Solution | 17–30 |

To the cathode electrolyte polyimide binder solution, prepared above, the metal oxide and conductive filler were added to form a slurry. The slurry was ball milled for approximately 60 minutes. The slurry was then diluted with NMP and ball milled for another 60 minutes. The resulting slurry was coated on a strip of aluminum and dried in an oven for about 20 to about 60 minutes at approximately 70–150° C. to form an ionically conductive and an electrochemically active cathode.

Anode Electrolyte Polyimide Binder Solution

| Raw Material | % by weight |
|---|---|
| MATRIMID 5218 | 9–15 |
| Lithium Salt | 6–12 |
| NMP | 75–85 |

The pre-imidized soluble, amorphous, thermoplastic polyimide powder, MATRIMID 5218, commercially available from Ciba-Geigy, was dissolved in 42–65% of the NMP to form an anode polyimide solution. A lithium salt solution, prepared by dissolving a lithium salt in the remaining portion of NMP, was added to the anode polyimide solution to form the anode electrolyte polyimide binder solution.

Anode

| Raw Material | % by weight |
|---|---|
| Intercalation material(graphite) | 38–50 |
| Conductive filler | 2–12 |
| Anode Electrolyte Polyimide Binder Solution | 13–20 |
| NMP | 28–40 |

To the anode electrolyte polyimide binder solution, prepared above, the metal oxide and conductive filler were added to form a slurry. The slurry was ball milled for approximately 60 minutes. The slurry was then diluted with NMP and ball milled for another 60 minutes. The resulting slurry was coated on a strip of copper and dried in an oven at approximately 75–150° C. for about 20 to about 60 minutes to form an ionically conductive and electrochemically active anode.

Electrolyte

An electroltye solution was prepared by mixing ethylene carbonate and dimethyl carbonate in a 1:1 molar ratio with $LiPF_6$ to form a 1 Molar solution. Other electrolyte solutions were prepared wherein the ratio of ethylene carbonate to dimethyl carbonate was varied from 1:1 to 2:1 to 1:2, respectively.

Example 2

A battery was prepared using the electrodes and electrolyte solutions of Example 1. A cell stack was assembled in the following manner: cathode, porous separator (Celgard 3401), anode, porous separator (Celgard 3401), etc. until 1–5 layers were stacked. The stack was then wound and pressurized at about 5 to about 250 psi. Maintaining pressure on the stack, the assembly was placed in a container where the liquid electrolyte was introduced. The container was then hermetically sealed.

Example 3

Figure 2:
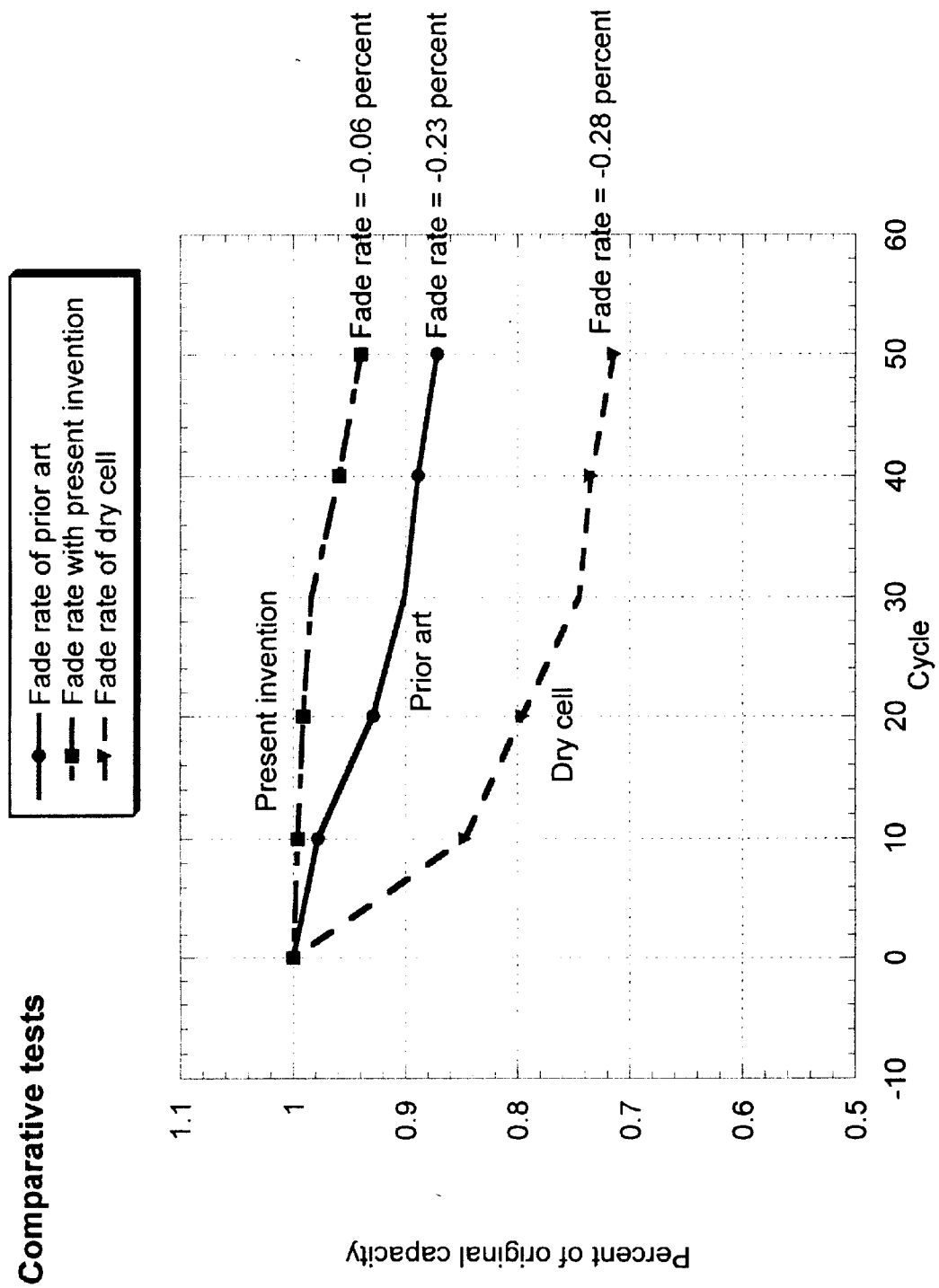
FIG. 2 is a plot comparing the initial fade rate over the first 50 cycles for the battery of the present invention, a prior art battery, and the dry cell of Gufstason et al.

The battery of Example 2 was tested for initial fade rate by charging and discharging the battery at a constant current over a range of 3.5–4.3 Volts for 50 cycles. Similar testing was conducted for prior art batteries and the dry cell of Gustafson et al. The results from the testing are shown in FIG. 2 where the initial fade rate over 50 cycles for the battery of the present invention was far superior (0.06%) to that of both the prior art (0.23%) batteries and the dry cell of Gustafson et al. (0.28%).

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A battery comprising:
   at least one anode;
   at least one cathode, each cathode comprising: a cathode current collector; a metal oxide; an electronic conductive filler; and an ionically conductive and electrochemically active cathode solid electrolyte polyimide binder; wherein the ionically conductive and electrochemically active cathode solid electrolyte polyimide binder comprises a lithium salt and a pre-imidized soluble, amorphous, thermoplastic polyimide powder, and wherein the lithium salt and the pre-imidized soluble, amorphous, thermoplastic polyimide powder are soluble in a polar solvent;
   at least one porous separator film disposed between each anode and each cathode; and
   a liquid electrolyte distributed throughout each anode, each cathode, and each porous separator film.

2. A battery according to claim 1, wherein each cathode is prepared from about 33% by weight to about 44% by weight of the metal oxide; from about 6% by weight to about 25% by weight of the electronic conductive filler; from about 27% by weight to about 35% by weight of the polar solvent; and from about 17% by weight to about 30% by weight of a cathode electrolyte polyimide binder solution.

3. A battery according to claim 2, wherein the cathode electrolyte polyimide binder solution comprises from about 7% by weight to about 12% by weight of a pre-imidized soluble, amorphous, thermoplastic polyimide powder dissolved in about 70% by weight to about 85% by weight of a polar solvent; and from about 8% by weight to about 13% by weight of a lithium salt.

4. A battery according to claim 1, wherein the lithium salt is selected from the group consisting of: LiCl, LiBr, LiI, Li(ClO$_4$), Li(BF$_4$), Li(PF$_6$), Li(AsF$_6$), Li(CH$_3$CO$_2$), Li(CF$_3$SO$_3$), Li(CF$_3$SO$_2$)$_2$N, Li(CF$_3$SO$_2$)$_3$, Li(CF$_3$CO$_2$), Li(B(C$_6$H$_5$)$_4$), Li(SCN), and Li(NO$_3$).

5. A battery according to claim 4, wherein the lithium salt is Li(PF$_6$).

6. A battery according to claim 1, wherein the metal oxide is selected from the group consisting of: LiCoO$_2$; LiMnO$_2$; LiNiO$_2$; V$_6$O$_{13}$; V$_2$O$_5$; and LiIn$_2$O$_4$.

7. A battery according to claim 1, wherein each anode comprises: an anode current collector; an electronic conductive filler; an intercalation material; and an ionically conductive and electrochemically active anode solid electrolyte polyimide binder; wherein the ionically conductive and electrochemically active anode solid electrolyte polyimide binder comprises a lithium salt and a pre-imidized soluble, amorphous, thermoplastic polyimide powder, wherein the lithium salt and the pre-imidized soluble, amorphous, thermoplastic polyimide powder are soluble in a polar solvent.

8. A battery according to claim 7, wherein each anode is prepared from about 38% by weight to about 50% by weight of the intercalation material; from about 2% by weight to about 12% by weight of the electronic conductive filler; from about 28% by weight to about 40% by weight of the polar solvent; and from about 13% by weight to about 20% by weight of an anode electrolyte polyimide binder solution.

9. A battery according to claim 8, wherein the anode electrolyte polyimide binder solution comprises from about 9% by weight to about 15% by weight of a pre-imidized soluble, amorphous, thermoplastic polyimide powder dissolved in about 75% by weight to about 85% by weight of a polar solvent; and from about 6% by weight to about 12% by weight of a lithium salt.

10. A battery according to claim 7, wherein the pre-imidized soluble, amorphous, thermoplastic polyimide powder comprising the ionically conductive and electrochemically active cathode solid electrolyte polyimide binder has the same chemical composition as the pre-imidized soluble, amorphous, thermoplastic polyimide powder comprising the ionically conductive and electrochemically active anode solid electrolyte polyimide binder.

11. A battery according to claim 7, wherein the pre-imidized soluble, amorphous, thermoplastic polyimide powder comprising the ionically conductive and electrochemically active cathode solid electrolyte polyimide binder has a different chemical composition from the pre-imidized soluble, amorphous, thermoplastic polyimide powder comprising the ionically conductive and electrochemically active anode solid electrolyte polyimide binder.

12. A battery according to claim 7, wherein the lithium salt is selected from the group consisting of: LiCl, LiBr, LiI, Li(ClO$_4$), Li(BF$_4$), Li(PF$_6$), Li(AsF$_6$), Li(CH$_3$CO$_2$), Li(CF$_3$SO$_3$), Li(CF$_3$SO$_2$)$_2$N, Li(CF$_3$SO$_2$)$_3$, Li(CF$_3$CO$_2$), Li(B(C$_6$H$_5$)$_4$), Li(SCN), and Li(NO$_3$).

13. A battery according to claim 12, wherein the lithium salt is Li(PF$_6$).

14. A battery comprising:
   at least one anode, each anode comprising: an anode current collector; an electronic conductive filler; an intercalation material; and an ionically conductive and electrochemically active anode solid electrolyte polyimide binder; wherein the ionically conductive and electrochemically active anode solid electrolyte polyimide binder comprises a lithium salt and a pre-imidized soluble, amorphous, thermoplastic polyimide powder, wherein the lithium salt and the pre-imidized soluble, amorphous, thermoplastic polyimide powder are soluble in a polar solvent;
   at least one cathode;
   at least one porous separator film disposed between each anode and each cathode; and
   a liquid electrolyte distributed throughout each anode, each cathode, and each porous separator film.

15. A battery according to claim 14, wherein each anode is prepared from about 38% by weight to about 50% by weight of the intercalation material; from about 2% by weight to about 12% by weight of the conductive filler; from about 28% by weight to about 40% by weight of the polar solvent; and from about 13% by weight to about 20% by weight of an anode electrolyte polyimide binder solution.

16. A battery according to claim 15, wherein the anode electrolyte polyimide binder solution comprises from about 9% by weight to about 15% by weight of a pre-imidized soluble, amorphous, thermoplastic polyimide powder dissolved in about 75% by weight to about 85% by weight of a polar solvent; and from about 6% by weight to about 12% by weight of a lithium salt.

17. A battery according to claim 16, wherein the lithium salt is selected from the group consisting of: LiCl, LiBr, LiI, Li(ClO$_4$), Li(BF$_4$), Li(PF$_6$), Li(AsF$_6$), Li(CH$_3$CO$_2$), Li(CF$_3$SO$_3$), Li(CF$_3$SO$_2$)$_2$N, Li(CF$_3$SO$_2$)$_3$, Li(CF$_3$CO$_2$), Li(B(C$_6$H$_5$)$_4$), Li(SCN), and Li(NO$_3$).

18. A battery according to claim 17, wherein the lithium salt is Li(PF$_6$).

19. A process for preparing a battery, the process comprising the steps of:
- a) preparing a cathode electrolyte polyimide binder solution comprising: a lithium salt and a pre-imidized soluble, amorphous, thermoplastic polyimide powder dissolved in a polar solvent;
- b) adding a metal oxide; a polar solvent; and an electronic conductive filler to the cathode electrolyte polyimide binder solution to form a slurry;
- c) coating a cathode current collector with the slurry;
- d) drying the coated cathode current collector to form an ionically conductive and electrochemically active cathode;
- e) providing an anode;
- f) providing a porous separator film;
- g) assembling the anode, the porous separator film; and the cathode to form a cell stack;
- h) applying and maintaining pressure on the cell stack;
- i) placing the cell stack in a container while maintaining pressure on the cell stack; and
- j) introducing a liquid electrolyte into the container and hermetically sealing the container.

20. A battery prepared by the process according to claim 19.

21. A process according to claim 19, wherein the anode is prepared by:
- a) preparing an anode electrolyte polyimide binder solution comprising:
  a lithium salt and a pre-imidized soluble, amorphous, thermoplastic polyimide powder dissolved in a polar solvent;
- b) adding an electronic conductive filler; a polar solvent; and an intercalation material to the anode electrolyte polyimide binder solution to form an anode slurry;
- c) coating the anode slurry on an anode current collector; and
- d) drying the anode current collector to form an ionically conductive and electrochemically active anode.

22. A process according to claim 21, wherein the pre-imidized soluble, amorphous, thermoplastic polyimide powder used to prepare the anode electrolyte polyimide binder solution has the same chemical composition as the pre-imidized soluble, amorphous, thermoplastic polyimide powder used to prepare the cathode electrolyte polyimide binder solution.

23. A process according to claim 21, wherein the pre-imidized soluble, amorphous, thermoplastic polyimide powder used to prepare the anode electrolyte polyimide binder solution has a different chemical composition than the pre-imidized soluble, amorphous, thermoplastic polyimide powder used to prepare the cathode electrolyte polyimide binder solution.

24. A battery prepared by the process according to claim 21.

25. A process for preparing a battery, the process comprising the steps of:
- a) preparing an anode electrolyte polyimide binder solution comprising: a lithium salt and a pre-imidized soluble, amorphous, thermoplastic polyimide powder dissolved in a polar solvent;
- b) adding an electronic conductive filler; a polar solvent; and an intercalation material to the anode electrolyte polyimide binder solution to form an anode slurry;
- c) coating the anode slurry on an anode current collector;
- d) drying the anode current collector to form an ionically conductive and electrochemically active anode;
- e) providing a cathode;
- f) providing a porous separator film;
- g) assembling the anode, the porous separator film; and the cathode to form a cell stack;
- h) applying and maintaining pressure on the cell stack;
- i) placing the cell stack in a container while maintaining pressure on the cell stack; and
- j) introducing a liquid electrolyte into the container and hermetically sealing the container.

26. A battery prepared by the process according to claim 25.

* * * * *